United States Patent [19]
Bakke et al.

[11] Patent Number: 5,337,564
[45] Date of Patent: Aug. 16, 1994

[54] FORCE OR PRESSURE AUGMENTING DEVICE

[75] Inventors: Asbjorn Bakke, Kongsberg; Tore Pedersen, Hvittingfoss, both of Norway

[73] Assignee: Kongsberg Automotive A/S, Kongsberg, Norway

[21] Appl. No.: 940,905

[22] PCT Filed: May 8, 1991

[86] PCT No.: PCT/NO91/00068

§ 371 Date: Oct. 28, 1992

§ 102(e) Date: Oct. 28, 1992

[87] PCT Pub. No.: WO91/17372

PCT Pub. Date: Nov. 14, 1991

[30] Foreign Application Priority Data

May 9, 1990 [NO] Norway .................. 90 2057

[51] Int. Cl.$^5$ .................. B60T 13/20; F16D 31/02
[52] U.S. Cl. .................. 60/555; 60/402
[58] Field of Search .................. 60/385, 386, 400, 402, 60/428, 430, 533, 547.1, 555, 560, 556, 557, 558; 91/151, 418, 469

[56] References Cited

U.S. PATENT DOCUMENTS

| | | | |
|---|---|---|---|
| 2,328,637 | 9/1943 | Freeman | 60/557 X |
| 2,467,273 | 4/1949 | Rockwell | 60/555 |
| 2,879,645 | 3/1959 | Ingres | 91/469 X |
| 3,182,443 | 5/1965 | Hermanns | 60/555 X |
| 4,254,623 | 3/1981 | Dauvergne | 60/556 X |
| 4,449,369 | 5/1984 | Dauvergne | 60/556 |
| 4,469,011 | 9/1984 | Löeffler | |
| 4,494,377 | 1/1985 | Sato | 60/547.1 X |
| 5,061,016 | 10/1991 | Hirobe | 60/555 X |

FOREIGN PATENT DOCUMENTS

| | | | |
|---|---|---|---|
| 0310733 | 4/1989 | European Pat. Off. | |
| 1083676 | 6/1960 | Fed. Rep. of Germany | 60/555 |
| 2440039 | 3/1976 | Fed. Rep. of Germany | |
| 1043696 | 11/1953 | France | 60/555 |
| 1251653 | 12/1960 | France | 60/555 |
| 1390560 | 4/1975 | United Kingdom | |
| 2205337 | 12/1987 | United Kingdom | |

Primary Examiner—Edward K. Look
Assistant Examiner—John Ryznic
Attorney, Agent, or Firm—Finnegan, Henderson, Farabow, Garrett & Dunner

[57] ABSTRACT

A clutch-servo for vehicles which constitutes a working device arranged for fluid connection with a master cylinder to be operated by the vehicle's driver. The servo comprises a working cylinder unit (50) with a piston (5) arranged in a working cylinder (1), which piston is connected to the clutch's engaging mechanism, and a control valve unit (60) for the working cylinder unit (50), with a valve body (21) arranged in the valve housing (44). The master cylinder has a fluid connection with the working cylinder unit (50) and the control valve unit (60), so that the fluid in the master cylinder simultaneously exerts a force on the piston (5) and the valve body (21), in order to try to release the clutch and to move the valve body (21) in order to connect the working cylinder unit (50) to a servo pressure fluid source when the driver operates the master cylinder. According to the invention the valve unit is constituted by a slide valve. Furthermore, the connection between the working cylinder unit (50) and the valve unit (60) is not dependent on mechanical function.

13 Claims, 3 Drawing Sheets

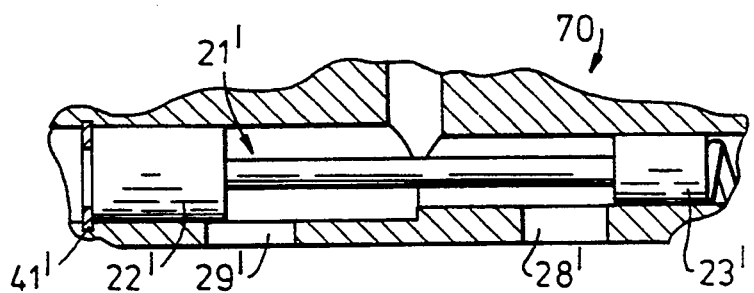
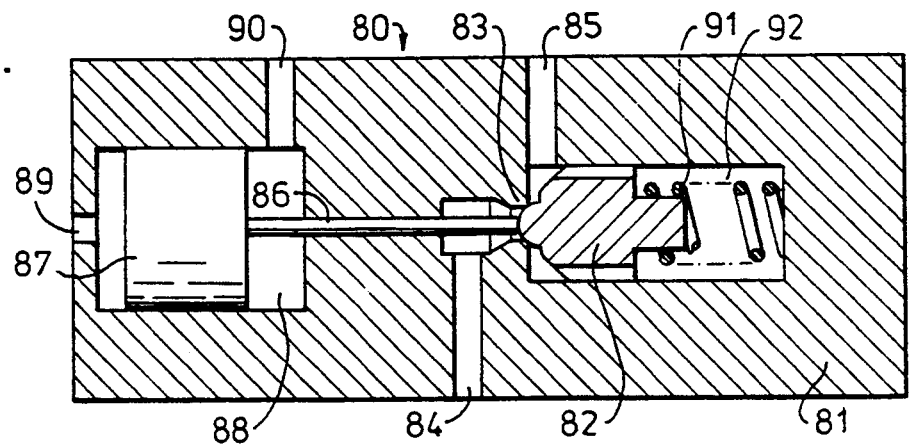
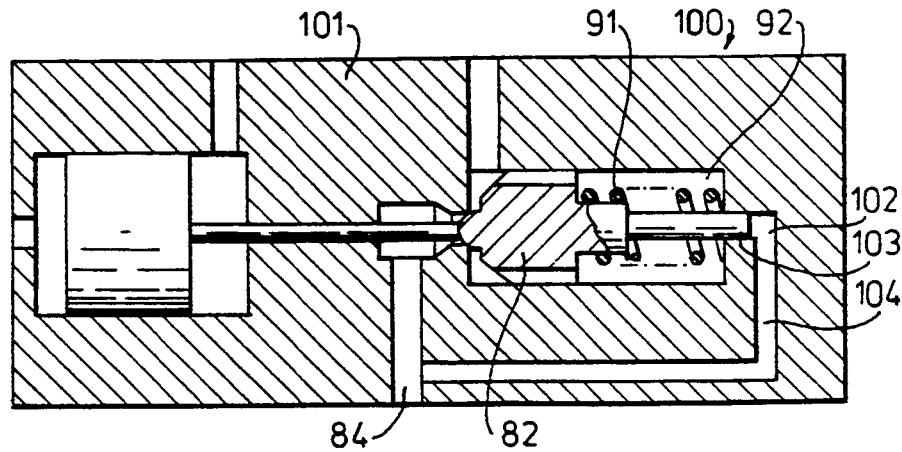

FORCE OR PRESSURE AUGMENTING DEVICE

BACKGROUND OF THE INVENTION

The invention concerns a force augmenting device, such as a clutch-servo for engaging and disengaging vehicle clutches, which device constitutes, a working or slave device arranged for fluid connection with a master cylinder to be operated by the vehicle's driver, comprising a working cylinder unit which has a piston installed in a working cylinder, housing or the like, which piston is connected to the unit which is to be actuated by the force or pressure augmenting device, and a control valve unit for the working cylinder, with a valve body which is installed in a valve housing with a supply channel and a return channel for a servo pressure fluid where the master cylinder has a fluid connection with the working cylinder unit and the control valve unit in such a way that the fluid from the master cylinder simultaneously exerts a force on the piston and on the valve body, in order to try to move the piston and the valve body respectively when the driver operates the master cylinder, and the valve body is arranged so as to provide communication between the working cylinder's cylinder space and the return channel for the servo pressure fluid when the master cylinder is not in operation, there being no functionally determined mechanical connection between the working cylinder unit and the valve unit.

A device of the above-mentioned type is described in U.S. Pat. No. 3,182,443, but since it comprises very many components it will thus be liable to failure during use. Furthermore these components have to be produced with fine tolerances, which makes this an expensive arrangement. The valve device is installed inside the piston, which therefore also has to be dismantled if the valve unit fails.

A further device of the above-mentioned type is also known from DE 24 40 039, where the piston is mechanically connected to a valve body which follows the movement of the piston when the clutch pedal is moved. Due to the substantial movement of the valve body, this will be subject to relatively heavy wear and tear, and as the working cylinder and the valve unit constitute a mechanical unit, both have to be dismantled if only one of the devices should fail. Moreover, the valve sealing rings are subject to great differential pressure, which makes the valve body hard to move.

Moreover, from EP patent application No. 0 310 733 it is known that a master cylinder may be hydraulically connected to a working cylinder and a control valve, the pressure from the master cylinder controlling the control valve which in its turn regulates the servo pressure fluid's access to a second working cylinder. The control valve which is shown, however, is a seat valve. Valves of this kind are unsuitable for proportional control purposes, and it has been shown that seat valves used in this connection cause relatively severe hysteresis while in addition the force required to operate the master cylinder will be highly dependent on the pressure of the servo pressure fluid.

The object of the invention is to provide a clutch-servo of the type described which is not encumbered with the above-mentioned disadvantages.

SUMMARY OF THE INVENTION

This object is achieved by providing in the above-described force or pressure augmenting device a valve unit that comprises a slide valve where the valve body is axially movable in a bore and comprises a first and a second end section and respectively whose diameter is adapted to suit the diameter of related bore sections of the bore, and which are connected to each other via a stem section, whose diameter is smaller than the diameter of the end sections, so that the bore, the end sections and the stem section define a valve room, whereby the outer end of the first end section, calculated in the longitudinal direction, is arranged so as to be actuated by the fluid from the master cylinder and to abut against a shoulder of the valve housing, a return device attempts to move the valve body against the shoulder, and the return channel and the supply channel for servo fluid are situated beside the first and the second end section respectively of the valve body, and in the valve housing there is also installed a connection channel whereby the working cylinder space can be connected to the valve space which in turn is connected to the return channel when the valve body is abutting the shoulder.

BRIEF DESCRIPTION OF THE DRAWINGS

The invention will now be described in more detail with reference to the drawings which illustrate schematically embodiments of the arrangement according to the invention.

FIG. 4 is a section as in FIG. 2 of a part of a second embodiment of a valve unit.

FIG. 5 is a section of a first embodiment of a shut-off valve.

FIG. 6 is a section as in FIG. 5 of a second embodiment of a shut-off valve.

DETAILED DESCRIPTION OF THE INVENTION

In the following, the device according to the invention will be described in connection with a clutch-servo.

Figure 1:
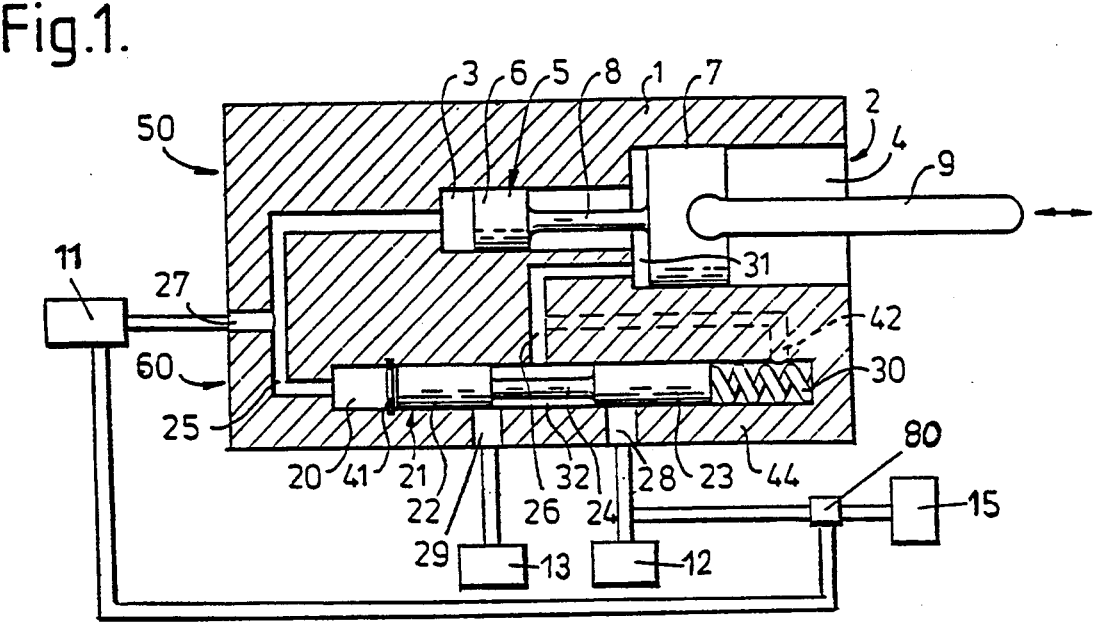
FIG. 1 is a cross section of a clutch-servo according to the invention.

As can be seen in FIG. 1 the clutch-servo comprises a housing 1 with a working cylinder unit 50 having a working cylinder main bore 2 with a first bore section 3 and a second bore section 4 whose diameter is larger than the diameter of the first bore section. In the main bore 2 is installed a piston 5 which has a first and a second end section 6 and 7 respectively which are arranged in respective first and second bore sections 3 and 4 of the main bore 2. The first end section 6 has a slightly smaller diameter than the second end section 7, and the end sections 6, 7 are connected to each other by a stem section 8 with a smaller diameter than the first end section 6, so that the bore sections 3, 4 together with the end sections 6, 7 and the stem section 8 define an annular working cylinder space 31. A piston rod 9 which is connected to the clutch's release mechanism (not shown), and which is connected to the second end section 7 of the piston 5, projects from the housing 1.

The clutch-servo also comprises a valve unit 60 which is similarly arranged in the housing 1, a valve bore 20 being made in this in which is arranged a valve body 21 which has a first and a second end section 22 and 23. The diameters of the end sections 22, 23 can be different, the diameter of the end section 22 preferably being larger than the diameter of the end section 23. The diameter of the end sections is adapted to suit the diameter of the respective sections of the bore 20, and the end sections are connected to each other by a stem section 24, whose diameter is smaller than the diameter of the end sections 22, 23, so that the bore 20 and the end sections 22, 23 and the stem section 24 defines a valve space 32. A first passage or channel 25 connects the first end section 3 of the working cylinder bore 2 with a first end section of the valve bore 20, situated at the first end section 22 of the valve body 21. A connection passage or channel 27 connects the channel 25 to a clutch master cylinder or master cylinder 11, which via a clutch pedal mechanism can be operated by the vehicle's driver in a per se known manner.

In the housing there are also installed two further connection bores or channels 28, 29, whose longitudinal axis is preferably perpendicular to the longitudinal axis of the valve bore 20, the distance between the channels 28, 29 being slightly larger than the distance between the end sections 22, 23 of the valve body 21.

A channel 26 connects the annular working cylinder space 31 with the valve bore space 32. In the above-mentioned first end section of the valve bore 20 is formed a shoulder which is constituted by for instance, a safety ring 41 inserted in an annular groove and which forms a stopper against which the first end section 22 of the valve body 21 can be placed, and in the opposite or second end section of the bore 20 is arranged a return means e.g. a helical spring 30, which biases the valve body 21 against the safety ring 41. Instead of or in addition to the spring 30, in the housing can be installed a channel 42 which provides communication between the channel 26 and the second end section of the bore 20.

Figure 2:
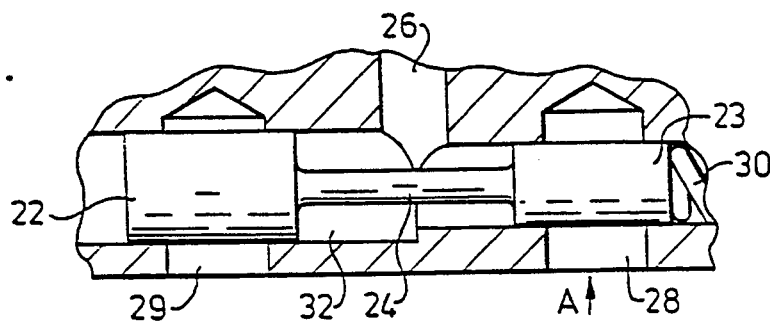
FIG. 2 is a section of a part of a first embodiment of a valve unit.
Figure 3:
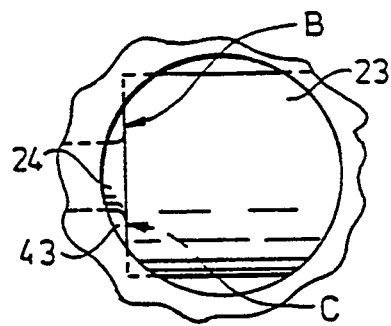
FIG. 3 is a sketch of the valve unit illustrated in FIG. 2, viewed in the direction of arrow A, but with the valve body in a different position.

As shown in FIG. 2 the diameter of the connection channels 28, 29 can be larger than the diameter of the valve bore 20 and the channels 28, 29 can be finished blind, projecting slightly into the housing on the opposite side of the channel inlets.

The connection channel 28 is arranged to be connected with a pressurized fluid source 12, e.g. a hydraulic pump, and channel 29 forms a return channel which is arranged to be connected to a reservoir 13 for the fluid.

The clutch-servo's method of operation is as follows, assuming that the fluids used are, e.g., hydraulic oil, and that the piston and the valve body have an initial position as illustrated in FIG. 1. In this position the clutch is engaged and the piston 5 and the valve body 21 are pressed completely over to the left by, e.g., the clutch's diaphragm spring device or spring 30.

As illustrated, in this position of the components, a communication is established between the working cylinder space 31, the valve space 32 and the return channel 29, so that the pressure in the working cylinder space and the valve space corresponds to the pressure of the oil in the oil reservoir.

When the vehicle's driver depresses the clutch pedal, this causes an increase in the pressure of the oil in channels 27, thus exerting forces which attempt to move the piston and the valve body towards the right of the drawing. If the valve body had become stuck in the bore 20, it would still be possible to move the piston 5 to the right to disengage the clutch, even though the driver would then have to exert a relatively large amount of force against the clutch pedal.

However, since the force required for movement of the valve body 21 is normally much less than the force required for movement of the piston 5, the valve body will be simultaneously moved to the right in FIG. 1 and thereby gradually close the return channel 29 and thereafter open the channel 28, thus allowing pressurized oil from the pressure oil source to flow into the working cylinder space 31 via channel 26. Due to the different diameter of the end sections of the piston 5, the piston will be moved to the right in FIG. 1 and cause the clutch to be disengaged. Oil from the clutch master cylinder will thereby be pressed into the first bore section 3 of the piston bore 2, causing the pedal to gradually be moved in the normal manner. If the pedal is stopped in an intermediate position the gradually increasing pressure of the oil in channel 42 and/or spring 30 together with the reduced pressure of the oil in channel 25 will cause the valve body to be displaced to the left in FIG. 1 and close the channel 28.

Also when the clutch pedal is released, and the pressure of the oil in channel 25 is reduced, this will bring the valve body 21 into contact with the stopper or safety ring 41, whereby the working cylinder space 31 is once again brought into communication with the reservoir for hydraulic oil. The pressure of the fluid in the working cylinder space 31 is thereby reduced, the piston 5 moved to the left in FIG. 1 and the clutch engaged.

The fluid in channel 25 and the clutch master cylinder can be of the same type as the pressure fluid supplied from the pressurized fluid source, or these fluids can be different, the fluid in channel 25 possibly being hydraulic oil and the fluid in channel 26 possibly being compressed air. If the fluid in channel 26 is compressed air, the clutch-servo can be simplified, since the return channel 29 can then flow out into the open air.

The advantage of the above-mentioned clutch device is that the force which is required to be exerted by the foot against the clutch pedal in order to release the clutch will substantially not be altered as the clutch disks wear out. In the case of ordinary clutch devices it is not unusual for the force required to disengage a clutch with worn disks to be 50% higher than the force required to disengage a clutch with new disks.

Furthermore, the release force required in ordinary clutch devices will vary depending on production tolerances and hysteresis in the clutch unit. The clutch-servo according to the invention can reduce such variations in force to a minimum.

Since the diameter of channels 28, 29 in the illustrated embodiment is larger than the valve bore 20, the connection between the pressure fluid source and the reservoir for pressure fluid will be achieved gradually and in diametrically opposite points in the valve body 21 to those indicated by arrows B and C, where arrow B indicates the flow of fluid on the side of the valve body facing towards the open end of channel 28 and thereafter into the passage 43 which becomes gradually larger as the valve body moves to the right of the figure, while arrow C indicates fluid flow first around the valve body 21 and thereafter into the corresponding opening situated on the diametrically opposite side. Thus a favourable, symmetrical flow around the valve body is obtained, thus preventing it from being influenced on one side only by the force exerted by the pressure fluid.

Furthermore an almost completely smooth movement of the piston 5 is achieved.

Even though the above describes the use of the device in connection with a clutch-servo, it is obvious that it can also be used for other purposes where there is a need for force augmentation.

It also describes how the working cylinder has a piston which exerts a force via a piston rod, but it will likewise be obvious that this piston can exert a force on a fluid in a cylinder, thus giving this fluid a higher pressure and therefore the device also has a pressure augmenting function.

Instead of having the valve body gradually open the supply channel for the servo pressure fluid and immediately close the return channel 29 when the master cylinder is operated, the valve unit can be designed as the valve unit 70 illustrated in FIG. 4, where parts corresponding to those described in connection with the valve unit 60 are given the same reference number but with an apostrophe added.

In this embodiment of the valve unit the supply channel 28' is connected to the working cylinder's cylinder space 31 during the complete stroke of valve body 21', and the first end section 22' of the valve body 21' is arranged so as to gradually close the return channel 29' when the valve body is moved away from the shoulder 41'.

This valve unit is specially suited for use when the servo pressure fluid is pressure fluid from a constant-volume-pump such as, e.g., that attached to the steering servo of a vehicle.

In those cases where a constant-pressure-pump is used and, e.g., where the device requires to be used immediately before this regular servo pressure fluid source has started, a hydraulic or pneumatic accumulator 15 can be installed in the conduit between this and the supply channel 28, as shown in FIG. 1.

However, since there is a risk that the pressure of the fluid in the accumulator may be reduced during a stoppage, with fluid leaking past the slide valve to the return channel 29, in may be advantageous to install a shut-off valve 80 between the accumulator 15 and the supply channel 28, as shown in FIG. 1. Since this valve is required to be either open or closed and it may remain open all the time during the operation of the regular pressure fluid source, there is no reason why this valve should not be of the seat valve type.

FIG. 5 is a schematic representation of this kind of shut-off valve 80 comprising a housing 81 with a valve body 82 which is arranged so as to abut against a seat portion 83, the valve being arranged so as to make or prevent a connection between an inlet channel 84 and an outlet channel 85. The inlet channel 84 is adapted to be connected with the outlet opening of an accumulator, and the outlet channel 85 is adapted to be connected with the supply channel 28 of the force augmenting device's control valve unit 60.

The valve body 82 is arranged to be moved in a bore 92 in the valve housing 81 towards and away from its valve seat 83 by means of a rod 86.

This rod 86 is connected to a piston 87 which is arranged to slide in a cylinder space 88 of the valve housing 81. That section of the cylinder space which faces away from the valve body has a passage 89 arranged to connect with the connecting passage 27 which is connected to the master cylinder, and the opposite section of the cylinder space has a return passage 90 for draining of any fluid which may leak past the piston 87. A return spring 91 exerts a constant force on the valve body 82 to bias it against its seat 83.

When the vehicle's clutch pedal is depressed, the increased pressure in the master cylinder will thus be transmitted both to the working cylinder unit 50, the control valve unit 60 and the shut-off valve 80, and the piston 87 will be moved towards the valve body from a first position and thereby move the valve body from its seat.

When the clutch pedal is moved in the opposite direction, and the fluid pressure exerted on the piston 87 has been reduced to a certain, small value, the return spring 91 will cause the valve body finally to abut against its seat and the piston to be moved back to the first position.

FIG. 6 illustrates a modification of the shut-off valve according to FIG. 5. In that section of the valve housing 101 which is situated at the opposite end of the bore 92 in relation to the valve seat, a bore 102 is made which forms a cylindrical guide section in which is slid a balancing piston 103 which is abutting the valve body. The diameter of this bore 102 corresponds to the diameter of the valve seat opening. Moreover, in the valve housing 101 is installed a balancing passage 104 which connects the inlet channel 84 to the bore 102. The force exerted against the valve body 82 as a result of the pressure of the fluid in the inlet channel 84 will thus be substantially counteracted by the force resulting from the pressure of the fluid in the balancing passage 104. In this case little force will have to be exerted by the return spring 91.

Figure 7:
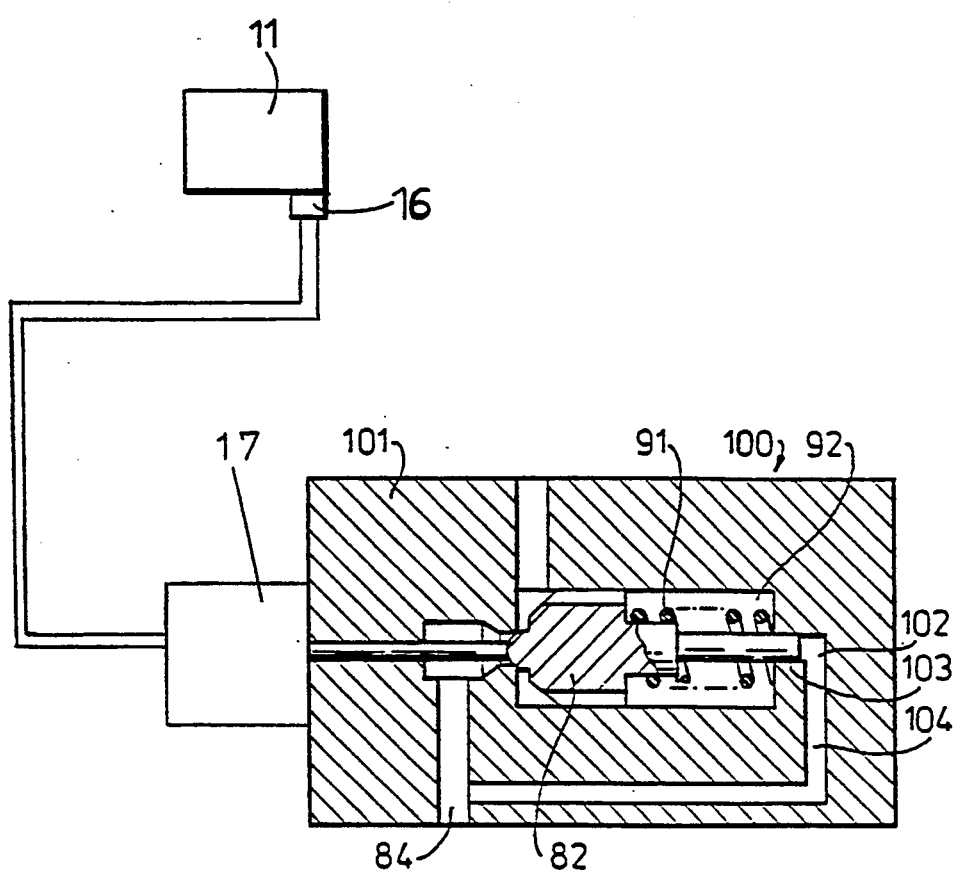
FIG. 7 is a view of a third embodiment of a shut-off valve, partly in section.

In this case, therefore, instead of a piston 87 it is possible to use an electrical solenoid 17 as shown in FIG. 7 which, e.g., can be supplied with electricity via an electrical circuit which can be closed and opened by means of a switch 16. This can be arranged with advantage to be operated by, e.g., the clutch pedal. Alternatively it can be arranged so that it is closed when the vehicle's engine is started and opened when this engine is stopped. Thus there is very little risk that this valve will cause a malfunction of the device.

We claim:

1. A device for augmenting the pressure between a master cylinder and a working unit to be operated by the master cylinder, said device comprising a working cylinder unit comprising a cylinder housing having an internal main bore having a longitudinal axis and a piston axially moveable in said bore, said piston having first and second sections spaced axially apart and connected to each other by a stem section of smaller cross-sectional area than the cross-sectional area of the first and second sections of said piston, said first and second sections defining between them with said main bore and the stem section a working cylinder space, the second section of said piston being connected to the working unit to be operated, a control valve unit for the working cylinder unit comprising a valve housing having a valve bore having a longitudinal axis with a valve body axially slidable in the valve bore, a supply channel communicating with said valve bore for supplying pressurized fluid from a source thereof to said valve bore and a return channel for exhausting pressurized fluid from said valve bore, said valve body comprising first and second sections spaced axially apart in said valve bore and connected to each other by a stem section of smaller cross-sectional area than the cross-sectional area of said first and second sections of said valve body, said first and second sections defining between them with said valve bore and said valve body stem section, a valve bore space, a connection channel for fluid communication of said working cylinder space of said working cylinder unit with said valve bore space of said control valve unit, said valve body in an at rest position being biased against a stop shoulder by a return means and in a position in said valve bore that permits said valve bore space to communicate, via said connection channel, said working cylinder space with said return channel, said working cylinder unit and said control valve unit being adapted for fluid connection with the master cylinder so that pressurized fluid from the master cylinder when open will simultaneously exert a force on the first section of the piston of the working cylinder unit and the first section of the valve body of the control valve unit to axially slide said piston in said cylinder main bore and to axially slide said valve body in said valve bore away from said stop shoulder against the force of said return means and into a working position in said valve bore that permits said valve bore space to communicate, via said connection channel, said working cylinder space with said supply channel, whereby pressurized fluid from said source will now be applied to said second section of the piston to augment the force exerted on the first section of the piston by the master cylinder.

2. The device of claim 1, wherein the supply channel communicates with said working cylinder space during the complete sliding stroke of the valve body and the first section of the valve body is constructed so that it will gradually close the return channel as the valve body moves away from the stop shoulder.

3. The device of claim 1, wherein, in the rest position of the valve body, the first section of the valve body is located in the valve bore so as to permit communication of the working cylinder space with the return channel via the connection channel and the valve bore space and the second section of the valve body is located in the valve bore so as to close off and not permit communication of the working cylinder space with the supply channel and, in the working position of the valve body, said first section of the valve body closing off communication of the working cylinder space with the return channel and the second section opening the valve bore space to the supply channel to thereby communicate the working cylinder space with the supply channel as the valve body moves away from the stop shoulder.

4. The device of claim 1 wherein the return means comprises a pressure spring located between the second section of the valve body and an end of the valve bore opposite from the first section of the valve body, the first section of said valve body resting against said shoulder stop when the valve body is in the at rest position.

5. The device of claim 1, wherein the return means comprises a channel in the valve housing that provides fluid communication between the connection channel and the valve bore at a point adjacent to a side of the second section of the valve body opposite from the first section thereof.

6. The device of claim 1, wherein the axes of the supply channel and of the return channel are perpendicular to the longitudinal axis of the valve bore.

7. The device claim 1, wherein the cross-sectional area of the supply channel and of the return channel are greater than the cross-sectional area of the adjacent portions of the valve bore.

8. The device of claim 6 or 7, wherein the return channel and the supply channel are both on opposite sides of the valve bore.

9. The device of claim 1, including a shut-off valve connected between the source of pressurized fluid and the supply channel.

10. The device of claim 9, wherein the shut-off valve comprises a shut-off valve body biased into a closed portion against a valve seat, said shut-off valve being connected to the master cylinder such that the valve body is moved away from its seat to open the shut-off valve and connect the source of pressurized fluid to the supply channel when the master cylinder is operated.

11. The device of claim 10, wherein the shut-off valve body is hydrostatically balanced in its direction of movement, there being provided in the valve housing a channel which leads pressurized supply fluid to a side of the valve body opposite from the valve seat.

12. The device of claim 11, wherein the shut-off valve includes a cylinder unit with a piston which is connected to the shut-off valve body, said piston being acted upon by the pressure of the fluid from the master cylinder to thereby exert a force on the shut-off valve body and move it away from its seat.

13. The device of claim 11, wherein the shut-off valve includes an electrical relay and the master cylinder is arranged to actuate a switch in an electrical circuit to cause magnetization of the relay and thereby move the valve body away from its seat and open the shut-off valve when the master cylinder is operated.

* * * * *

UNITED STATES PATENT AND TRADEMARK OFFICE
CERTIFICATE OF CORRECTION

PATENT NO. : 5,337,564
DATED : August 16, 1994
INVENTOR(S) : Asbjørn BAKKE ET AL.

It is certified that error appears in the above-indentified patent and that said Letters Patent is hereby corrected as shown below:

Claim 1, column 7, line 12, "open" should read --operated--.

Signed and Sealed this

Twentieth Day of December, 1994

Attest:

BRUCE LEHMAN

Attesting Officer     Commissioner of Patents and Trademarks